United States Patent
Oriakhi et al.

(10) Patent No.: US 7,455,805 B2
(45) Date of Patent: *Nov. 25, 2008

(54) RESIN-MODIFIED INORGANIC PHOSPHATE CEMENT FOR SOLID FREEFORM FABRICATION

(75) Inventors: Christopher Oriakhi, Corvallis, OR (US); Terry M. Lambright, Corvallis, OR (US); Isaac Farr, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 801 days.

This patent is subject to a terminal disclaimer.

(21) Appl. No.: 10/696,330

(22) Filed: Oct. 28, 2003

(65) Prior Publication Data

US 2005/0089636 A1   Apr. 28, 2005

(51) Int. Cl.
   *B27N 3/02*   (2006.01)
   *B29C 35/08*  (2006.01)
   *B29C 41/02*  (2006.01)
(52) U.S. Cl. .................... 264/463; 264/78; 264/113
(58) Field of Classification Search ............ 264/78, 264/113, 463, 494
   See application file for complete search history.

(56) References Cited

U.S. PATENT DOCUMENTS

| 6,217,816 | B1 | 4/2001 | Tang |
| 6,540,784 | B2 | 4/2003 | Barlow et al. |
| 2001/0050031 | A1* | 12/2001 | Bredt et al. .............. 106/162.9 |
| 2002/0026982 | A1 | 3/2002 | Bredt et al. |
| 2004/0266943 | A1* | 12/2004 | Oriakhi ...................... 524/556 |
| 2005/0079086 | A1* | 4/2005 | Farr et al. ...................... 419/36 |
| 2005/0082710 | A1* | 4/2005 | Oriakhi et al. .............. 264/113 |
| 2005/0087903 | A1* | 4/2005 | Farr et al. ................... 264/113 |

FOREIGN PATENT DOCUMENTS

| DE | 10158233 A1 | 11/2001 |
| JP | A-S61-083107 | 4/1986 |
| JP | S62-019508 | 1/1987 |
| JP | A-H02-250810 | 10/1990 |
| JP | H10-072306 | 3/1998 |
| JP | H11-228327 | 8/1999 |
| JP | 2002-527144 | 8/2002 |
| JP | 2003-507120 | 3/2003 |
| JP | 2003-531220 | 10/2003 |

* cited by examiner

Primary Examiner—Leo B Tentoni

(57) ABSTRACT

A method for solid free-form fabrication of a three-dimensional object includes depositing a particulate blend in a defined region, the particulate blend including radical source particulates, polyacid particulates, multivalent cation particulates, and a calcium phosphate source particulates, ink-jetting a liquid phase binder onto a predetermined area of the particulate blend to form hydrated cement in the predetermined area, wherein the liquid phase binder is acidic and includes reactive monomers, and hardening the hydrated cement.

18 Claims, 5 Drawing Sheets

RESIN-MODIFIED INORGANIC PHOSPHATE CEMENT FOR SOLID FREEFORM FABRICATION

BACKGROUND

The efficient production of prototype three-dimensional compositions or objects can provide an effective means of reducing the time it takes to bring a product to market at a reasonable cost. A typical approach for preparing prototypes has required specific tooling, such as molds and dies, which can be a slow and cumbersome process.

Recently, computerized modeling has alleviated some of the need for building prototypes. Computer modeling can be carried out quickly and provide a good idea of what a product will look like without a specialized tooling requirement. However, the fabrication of a tangible object is still often preferred for prototyping. The merging of computer modeling and the physical formation of three-dimensional objects is sometimes referred to as solid freeform fabrication.

Solid freeform fabrication (SFF) is a process whereby three-dimensional objects, for example, prototype parts, models, working tools, production parts, molds, and other articles are manufactured by sequentially depositing layers of a structural material. Computer aided design (CAD) is commonly used to automate the design process. Using a suitable computer, an operator may design a three-dimensional article and then create that object by employing a positionable ejection head that selectively emits the structural material. Various techniques that employ solid freeform fabrication have been explored.

Traditional methods of forming solid freeform fabrication objects include using commercially available gypsum and biopolymer systems or acid-base cements. The gypsum and biopolymer system necessitates numerous hours to set and the final object has poor mechanical properties. Similarly, the acid-base cement method tends to produce final objects that have low fracture toughness, are sensitive to environmental changes such as humidity, and result in poor definition of the resulting SFF article's detail.

SUMMARY

A method for solid free-form fabrication of a three-dimensional object includes depositing a particulate blend in a defined region, the particulate blend including radical source particulates, polyacid particulates, multivalent cation particulates, and a calcium phosphate source particulates, ink-jetting a liquid phase binder onto a predetermined area of the particulate blend to form hydrated cement in the predetermined area, wherein the liquid phase binder is acidic and includes reactive monomers, and hardening the hydrated cement.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

A method and apparatus for forming SFF articles with resin-modified inorganic phosphate cement is described herein. More specifically, an inorganic phosphate cement is incorporated with a reactive matrix-forming binder to create three-dimensional objects that are set due to three setting reactions.

As used in the present specification and in the appended claims, the term "cement" is meant to be understood broadly as any building material that hardens to act as an adhesive. Similarly, "binder" is meant to be understood broadly as any material used to bind separate particles together or facilitate adhesion to a surface. Additionally, the term "substrate" is meant to be understood as any build platform, removable material, or previously deposited reactive or powder material. A "build platform" is typically a rigid substrate that is used to support deposited material from a SFF apparatus. Similarly, the terms "set" or "setting" is meant to refer to the process of hardening a substance to form a solid three dimensional object.

In the following description, for purposes of explanation, numerous specific details are set forth in order to provide a thorough understanding of the present system and method for forming SFF articles with a resin-modified inorganic phosphate cement. It will be apparent, however, to one skilled in the art that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
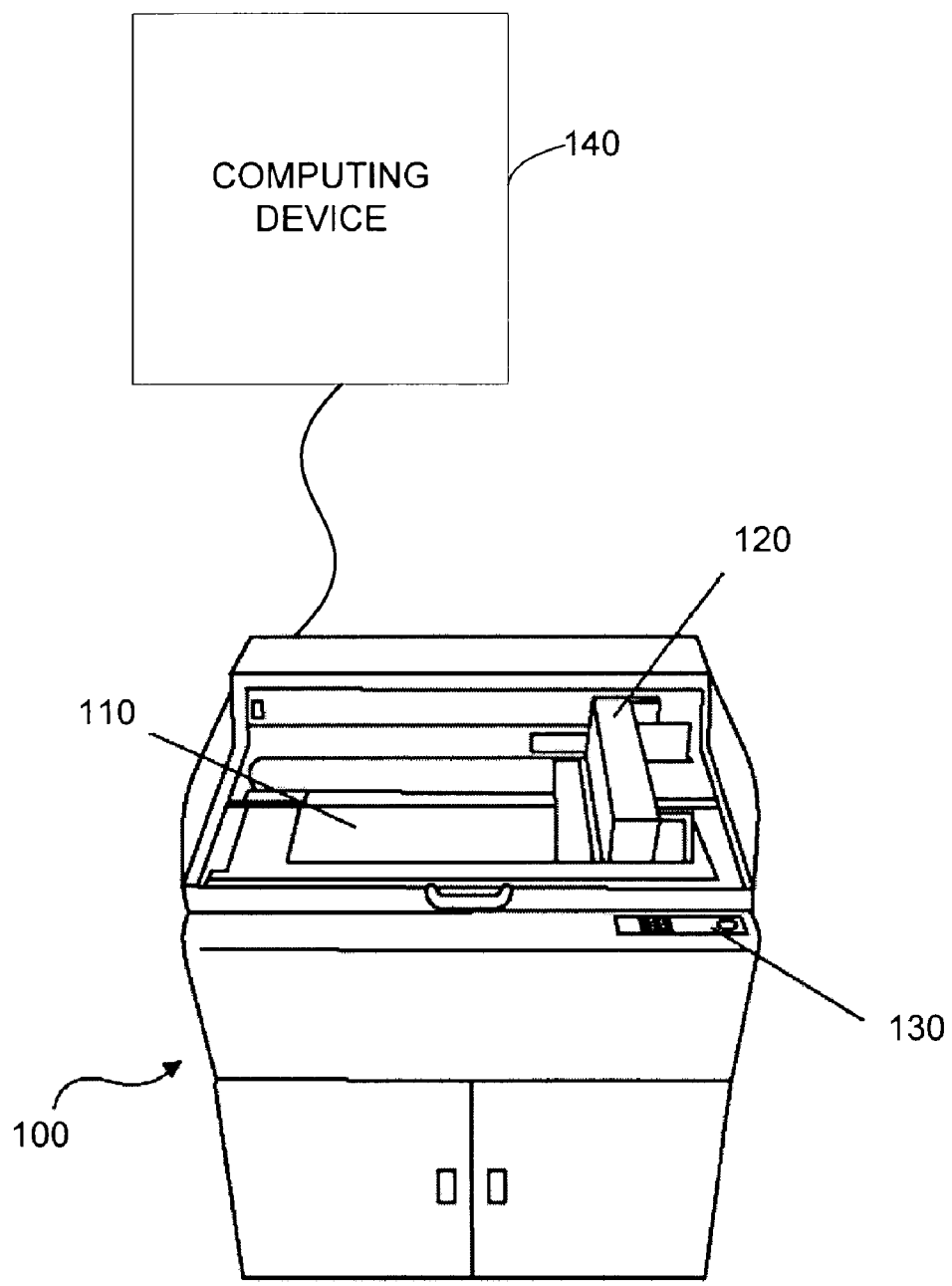
FIG. 1 is a perspective view of a solid freeform fabrication system that may be used to implement exemplary embodiments of the present system and method.

FIG. 1 illustrates a solid freeform fabrication (SFF) system (100) that may incorporate the present method of forming SFF articles with a resin-modified inorganic phosphate cement. As shown in FIG. 1, a solid freeform fabrication system may include a fabrication bin (110), a moveable stage (120), and a display panel (130) including a number of controls and displays. Additionally, a computing device (140) may be communicatively coupled to the SFF system (100).

The fabrication bin (110) shown in FIG. 1 may be configured to receive and facilitate the building of a desired three-dimensional object on a substrate. The building of the desired three-dimensional object may include the spreading of a powder and the selective dispensing of a binder into the powder. While the SFF system (100) illustrated in FIG. 1 is shown as a single, standalone, self-contained freeform fabrication system, the present powder based SFF system and methods may be incorporated into any freeform fabrication system that utilizes powder-based methods, regardless of the structure or configuration of the freeform fabrication system.

The moveable stage (120) of the SFF system (100) illustrated in FIG. 1 is a moveable material dispenser that may include any number of inkjet material dispensers configured to dispense liquid binder material. The moveable stage (120) may be controlled by a computing device (140) and may be controllably moved by, for example, a shaft system, a belt system, a chain system, etc. As the moveable stage (120) operates, the display panel (130) may inform a user of operating conditions as well as provide the user with a user interface.

As a desired three-dimensional object is formed, the computing device (140) may controllably position the moveable stage (120) and direct one or more of the dispensers (not shown) to controllably dispense liquid binder material at predetermined locations within the fabrication bin (110) thereby forming a desired three-dimensional object. The inkjet material dispensers used by the solid freeform fabrication system (100) may be any type of inkjet dispenser configured to perform the present method including, but in no way limited to, thermally actuated inkjet dispensers, mechanically actuated inkjet dispensers, electrostatically actuated inkjet dispensers, magnetically actuated dispensers, piezoelectrically actuated dispensers, continuous inkjet dispensers, etc. Additionally, the ink-jet printhead dispenser can be heated to assist in dispensing viscous chemical compositions. A more demonstrative cross-sectional view of the SFF apparatus of FIG. 1 is presented in FIG. 2.

Figure 2:
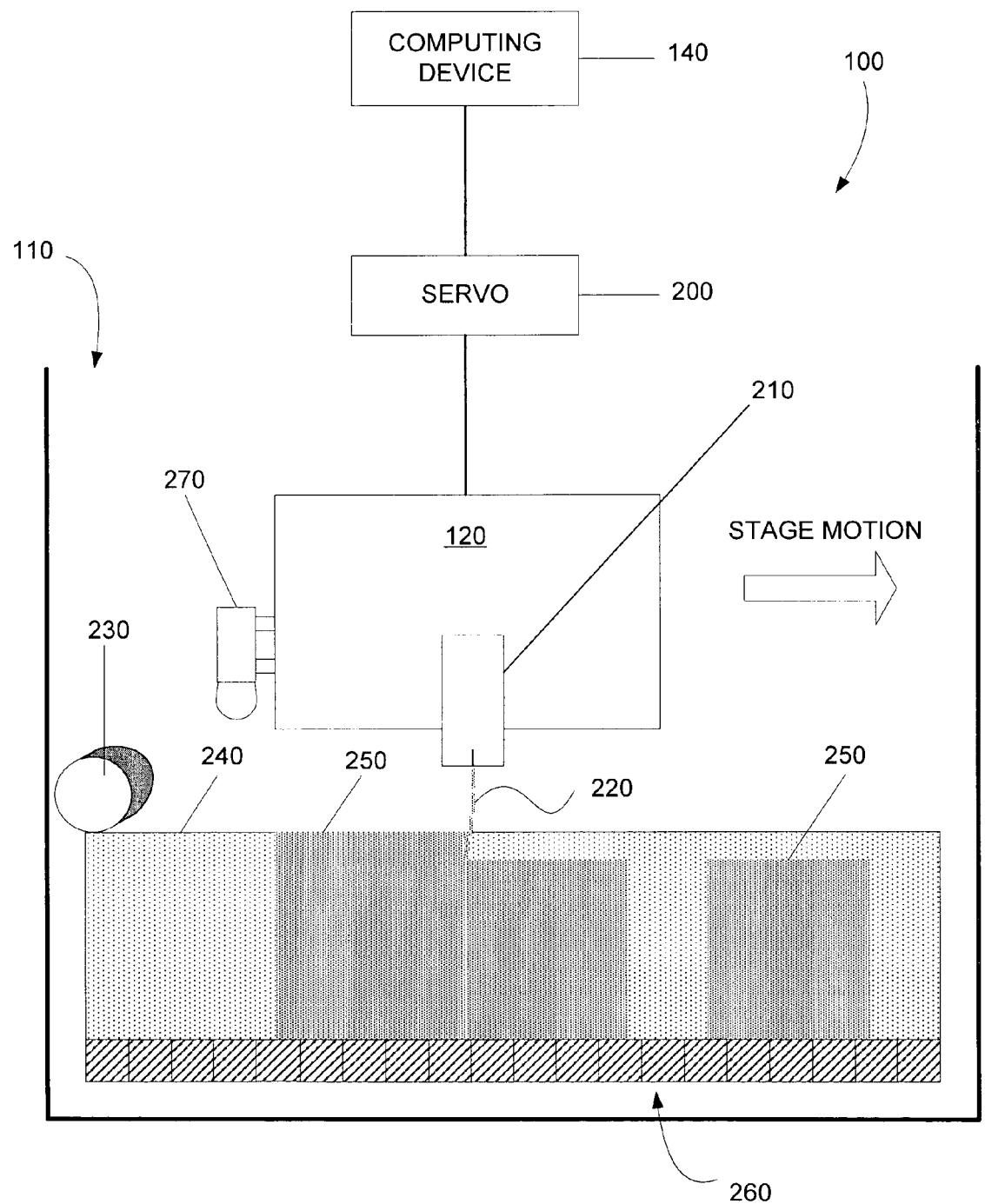
FIG. 2 is a cross-sectional view of a solid freeform fabrication system that may be used to implement exemplary embodiments of the present system and method.

As shown in FIG. 2, the computing device (140) may be communicatively coupled to a servo mechanism (200). The computing device (140) may communicate commands to the servo mechanism (200) causing it to selectively position the moveable stage (120). One or more inkjet dispensers (210) may be coupled to the moveable stage (120) and to a number of material reservoirs (not shown). Once positioned by the servo mechanism (200), the inkjet dispenser (210) may eject a liquid phase binder (220) supplied by the material reservoir. The liquid phase binder (220) that is stored in the material reservoir (not shown) and supplied to the inkjet dispenser (210) to be dispensed may include water soluble polymerizable components, pH modifiers, and one or more of the following: dye, pigment colorants, wetting agents, viscosity modifying agents, co-initiators, UV-radical formers, and surfactants. The advantages and reactions of the liquid phase binder (220) will be described in detail below with reference to FIGS. 2 through 4D.

Moreover, a radiation applicator (270) is also shown coupled to the movable stage. The radiation applicator shown in FIG. 2 is configured to apply radiation to dispensed material after deposition. Additionally, the radiation applicator (270) may be any device configured to apply ultraviolet (UV) or other radiation sufficient to set or cure deposited material. As shown in FIG. 2, the radiation applicator (270) may be coupled to the moveable stage (120) as a scanning unit. Alternatively, the radiation applicator (270) may be a separate light exposer or scanning unit configured to flood expose all or selective portions of deposited material after a segment of build material has been deposited.

FIG. 2 also illustrates the components of the present system that may be used to receive the liquid phase binder (220) and aid in the formation of a desired three-dimensional object. As shown in FIG. 2, the fabrication bin (110) of the SFF system (100) may include a substrate (260) having a cement forming particulate blend (240) disposed thereon. According to one exemplary embodiment, the cement forming particulate blend (240) may be dispensed layer by layer onto the substrate (260) in bulk quantities from a powder reservoir (not shown) and planarized to a desired thickness with the use of a mechanical roller (230). Each layer of the cement forming particulate blend (240) may be spread from about 0.005 to over 1 millimeter thick depending on the powder sizes employed. Control of the mechanical roller (230) may be performed by the servo mechanism (200) to controllably deposit and planarize the cement forming particulate blend (240) on the substrate (260). The cement forming particulate blend (240) dispensed onto the substrate includes one or more of the following: pH modifiers, a radical forming source, polyacids, a calcium phosphate source, reaction accelerators/retarders, strengthening agents, nanocomposites, and multivalent cationic particulates. Composition, interaction, and functions of the components of the cement forming particulate blend (240) will be described in further detail below with reference to FIGS. 2 through 4D.

Once the liquid phase binder (220) is dispensed in the layer of cement forming particulate blend (240), a mixture (250) of liquid phase binder (220) and cement forming particulate blend (240) exists on the substrate (260) defining a cross-sectional area of a desired three-dimensional object. The system and method for using the solid freeform fabrication system (100) illustrated in FIG. 2 will be described in detail below with reference to FIG. 3 through FIG. 4D.

Exemplary Compositions

As shown in FIG. 2, the present system and method for operating an SFF system (100) while incorporating resin-modified inorganic phosphate cement includes the combination of a cement forming particulate blend (240) with a liquid phase binder (220). Exemplary compositions of the cement forming particulate blend (240) and the liquid phase binder (220) will be given herein.

As stated previously, the liquid phase binder (220) stored in the material reservoir (not shown) and supplied to the inkjet dispenser (210) to be dispensed may include water soluble polymerizable components, pH modifiers, and one or more of the following: dye, pigment colorants, wetting agents, viscosity modifying agents, surfactants, UV-radical formers, and co-initiators.

The liquid phase binder (220) illustrated in FIG. 2 may include a number of water soluble polymerizable components. The water soluble polymerizable components participate in the polymerization setting mechanism explained in detail below. According to one exemplary embodiment, the present liquid phase binder (220) may include any number of water soluble polymerizable components including, but in no way limited to, multifunctional monomers such as glycol dimethacrylate, and monofunctional monomers such as 2-hydroxyethylmethacrylate 2-hydroxybutylmethacrylate.

Potential of Hydrogen (pH) modifiers may also be added to the liquid phase binder (220) in order to decrease the pH of the system which subsequently increases the rate of reaction and decreases the curing time of the resulting three-dimensional object. Additionally, the pH modifiers take an active role in the re-precipitation setting mechanism by facilitating an acidic or basic environment for the reaction. The pH modifiers included in the present liquid phase binder may include, but are in no way limited to, phytic acid, itaconic acid, diglycolic acid, mineral acid (phosphoric acid), etc.

Additionally, dye colorants and pigment colorants may be added to the liquid phase binder (220) in order to produce a three-dimensional object of one or more colors. The dye colorants and pigment colorants may be a single color equally distributed in the liquid phase binder (220) or they may be multiple colors housed in separate material reservoirs (not shown).

Wetting agents are included in the liquid phase binder in order to facilitate wetting of the cement forming particulate blend (240) as well as to bring a number of components in the cement forming particulate blend (240) into solution to facilitate reaction. Wetting agents that may be included in the present liquid phase binder include, but are in no way limited to, water. Water may be used due to its low cost and efficiency in wetting cement forming powders.

The liquid phase binder (220) illustrated in FIG. 2 is also jettable from an inkjet dispenser. While a liquid binder of water alone is jettable, it is jetted inefficiently. The present liquid phase binder (220) is aqueous based but due to the added reactive components, the following are also typically added to improve jettability: surfactants and viscosity modifiers including, but in no way limited to, surfynol 465.

UV radical formers and co-initiators may also be added to the liquid phase binder (220). The UV radical formers and co-initiators may be added to the liquid phase binder (220) in order to facilitate the polymerization setting mechanism. The radical formers may be either chemically or light activated and may include, but is in no way limited to, peroxide plus an amine, benzophenone or UV/blue light initiator.

According to one exemplary embodiment, the above-mentioned components are all combined in the liquid phase binder (220). According to one exemplary embodiment, the liquid phase binder (220) comprises water, organic acid, water soluble acrylic monomers, mineral acid, catalyst, dye colorants, pigment colorants, pyrrolidone, 1,5-hexanediol, liponic ethylene glycol, radical formers, co-initiators, and surfynol 465.

FIG. 2 also illustrates the cement forming particulate blend (240). The cement forming particulate blend (240) dispensed onto the substrate includes one or more of the following: a radical forming source, polyacids, a calcium phosphate source, reaction accelerators/retarders, pH modifiers, strengthening agents, nanocomposites, and multivalent cationic particulates.

A radical source or radical former may be included in the present cement forming particulate blend (240) in order to facilitate the polymerization setting mechanism. The radical source may be either chemically or light activated and may include, but is in no way limited to, peroxide plus an amine, benzophenone or UV/blue light initiator.

As noted above, cross-linkable polyacids are also included in the present cement forming particulate blend (240) to react with divalent cations present in the resulting mixture (250). By reacting with multivalent cations present in the resulting mixture (250), the cross-linkable polyacids fuel the acid-base setting mechanism explained below. The cross-linkable polyacids that may be included in the present cement forming particulate blend (240) include, but are in no way limited to, polyacrylic acid (PAA), polyvinyl pyrrolidone-co-maleic acid, polyethylene-co-methacrylic acid, and other poly acids.

The cement forming particulate blend (240) illustrated in FIG. 2 includes a calcium phosphate source to facilitate the re-precipitation setting mechanism explained below with reference to FIG. 3. The calcium phosphate source included in the present cement forming particulate blend (240) may include, but is not limited to, mono-, di-, tri-, tetra-calcium phosphate.

Moreover, reaction accelerators/retarders may be included in the present cement forming particulate blend (240). These reaction accelerators/retarders may include, but are in no way limited to, pH modifiers that increase or decrease the pH of the system thereby affecting the rate of reaction and curing time of the resulting three-dimensional object. Specifically, the inclusion of citric acid in the present cement forming particulate blend (240) may accelerate the re-precipitation setting mechanism explained in further detail below with reference to FIG. 3. The pH modifiers included in the present cement forming particulate blend (240) may include, but are in no way limited to one or more of the following: tartaric acid, citric acid, glutamic acid, diglycolic acid, DL aspartic acid, iminodiacetic acid, itaconic acid, and NH4H2PO4.

Multivalent cation species may also be included in the present cement forming particulate blend (240) to react with the polyacids during the acid-base setting mechanism. Any number of multivalent cation species may be incorporated including, but in no way limited to, calcium (2+), aluminum (3+), etc.

Strengthening agents such as nanocomposites may also be included in the present cement forming particulate blend (240). The nanocomposites may include, but are in no way limited to one or more of the following: PEO/clay nanocomposites, hydroxyapatite nanocomposites, layered double hydroxide (LDH) nanocomposites and organophillic nanocomposites. Typical nanocomposites not only act as reinforcing agents, they may also act as moisture reservoirs in the desired three-dimensional object to add structural support and to prevent moisture loss which may result in drying or cracking of the produced three-dimensional object.

Hydroxyapatite, listed above in the list of nanocomposites, serves more as a nanofiller in the present system rather than a moisture reservoir. However, the hydroxyapatite may also be included in the present cement-forming particulate blend (240) in order to seed the re-precipitation setting mechanism described in detail below.

The above-mentioned components of the cement forming particulate blend (240) may be combined in a number of formulations to produce a desired three-dimensional object when combined with the liquid phase binder (220) and are in no way limited to the examples listed above. One exemplary combination of the cement forming particulate blend may include tricalcium phosphate, tetracalcium phosphate, hydroxyapatite, polyacrylic acid, polyethylene-co-methacrylic acid, polyvinyl pyrrolidone-co-maleic acid, citric acid, ascorbic acid, Cu(NO3)2, benzophenone, and layered double hydroxide nanocomposites.

Exemplary Implementation and Operation

Figure 3:
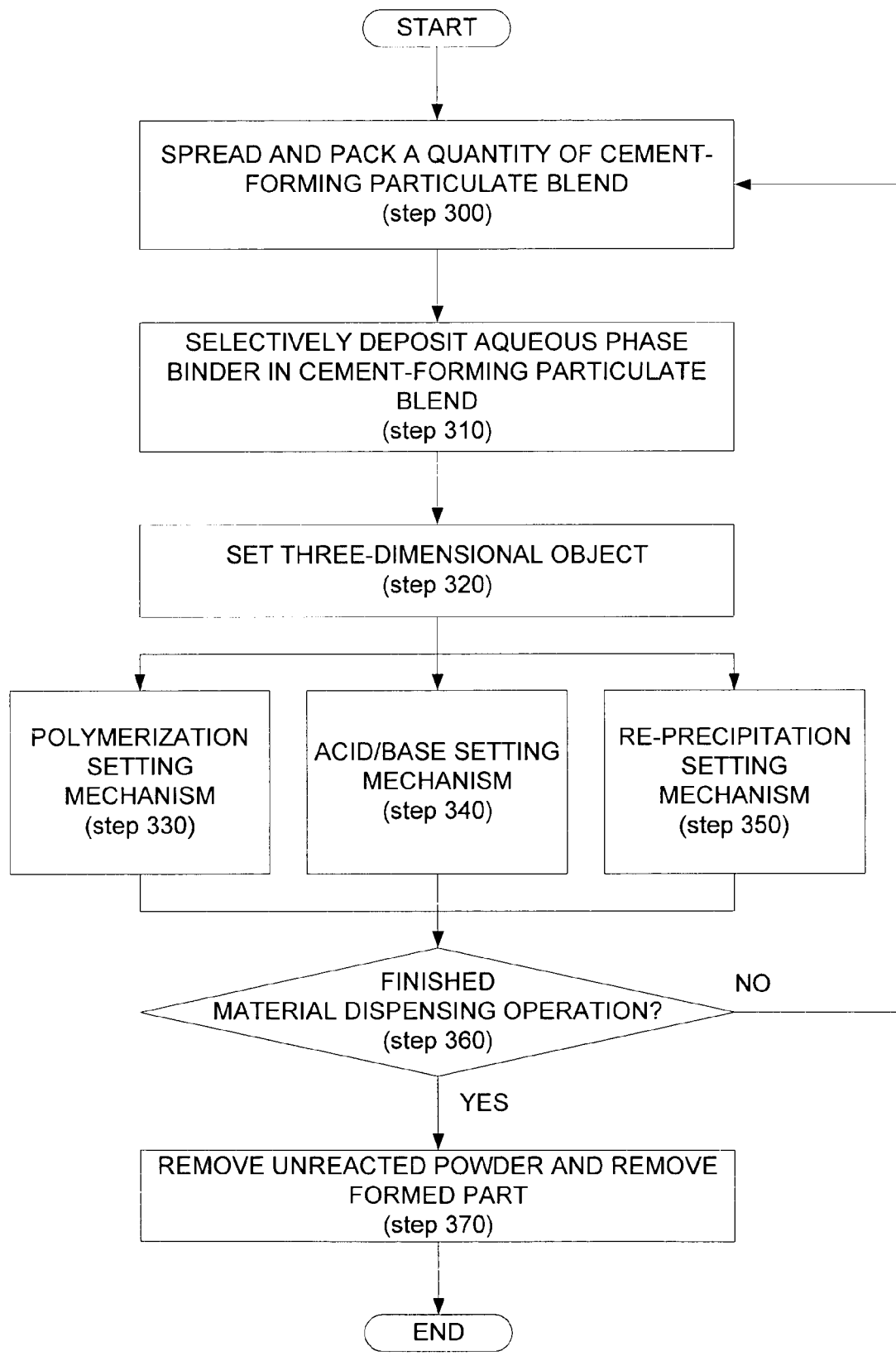
FIG. 3 is a flow chart illustrating a method for performing the present method using resin-modified inorganic phosphate cement according to one exemplary embodiment.

FIG. 3 is a flow chart illustrating a present method for operating the present SFF system (100; FIG. 2) while incorporating a cement-forming particulate blend (240; FIG. 2) according to one exemplary embodiment. While FIG. 3 illustrates one exemplary theory for solidification of the present system and method, the present system and method is in no way limited to the method of operation illustrated in FIG. 3. As shown in FIG. 3, the present method begins by spreading and packing a specified quantity of cement forming particulate blend (step 300). Once a specified quantity of cement forming particulate blend has been spread, the SFF system (100; FIG. 2) selectively deposits a specified quantity of liquid phase binder into the cement forming particulate blend (step 310). Once the cement forming particulate blend and the liquid binder combine, a cross-section of the three-dimensional object is set (step 320). The setting of the three-dimensional object occurs as a result of three distinct setting mechanisms. As shown in FIG. 3, the setting of the three-dimensional object (step 320) includes a polymerization setting mechanism (step 330), an acid/base setting mechanism (step 340), and a re-precipitation setting mechanism (step 350). Upon completion of, or during the setting of the three-dimensional object, the SFF system (100; FIG. 2) determines whether it has finished all of the material dispensing operations needed to form the desired three-dimensional object (step 360). If the material dispensing operation is complete (YES, step 360), un-reacted cement forming particulate blend is removed from the formed part (step 370) and the formation process is complete. If, however, the SFF system (100; FIG. 2) determines that it has not finished the material dispensing operation (NO, step 360), the SFF system returns again to step 300 and spreads and packs another quantity of cement forming particulate blend (step 300) in preparation for performing another binder deposition. The above-mentioned process will now be described in detail with reference to FIG. 4A through FIG. 4D.

Figure 4A:
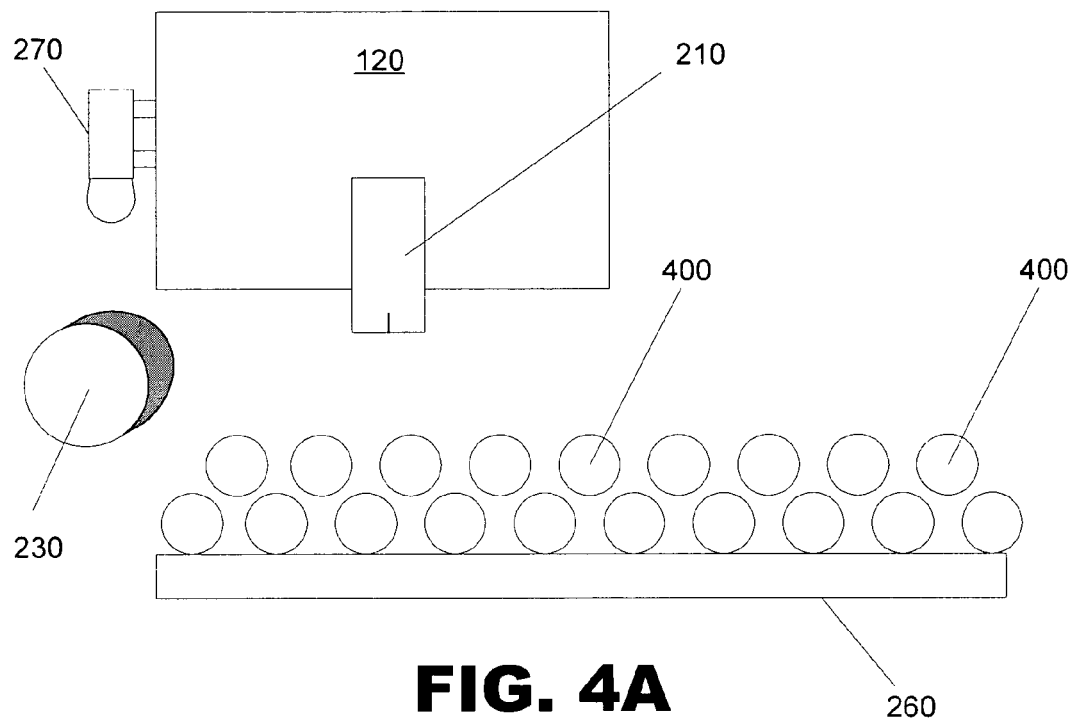
FIG. 4A is a cross-sectional view illustrating a powder that may be used by the present method according to one exemplary embodiment.

As depicted in FIG. 3, the present system and method begins by spreading and packing a quantity of cement forming particulate blend (step 300). FIG. 4A illustrates a quantity of cement forming particulate blend (400) that has been spread and packed on a substrate (260) using a mechanical roller (230). The minimum layer thickness that may be spread is governed primarily by the powder size. According to one exemplary embodiment, the powder may be spread to a thickness of about 0.005 to over 1 millimeter. As mentioned previously, the cement forming particulate blend (400) includes one or more of the following: a radical forming source, polyacids, a calcium phosphate source, reaction accelerators/retarders, pH modifiers, strengthening agents, nanocomposites, and multivalent cationic particulates.

Figure 4B:
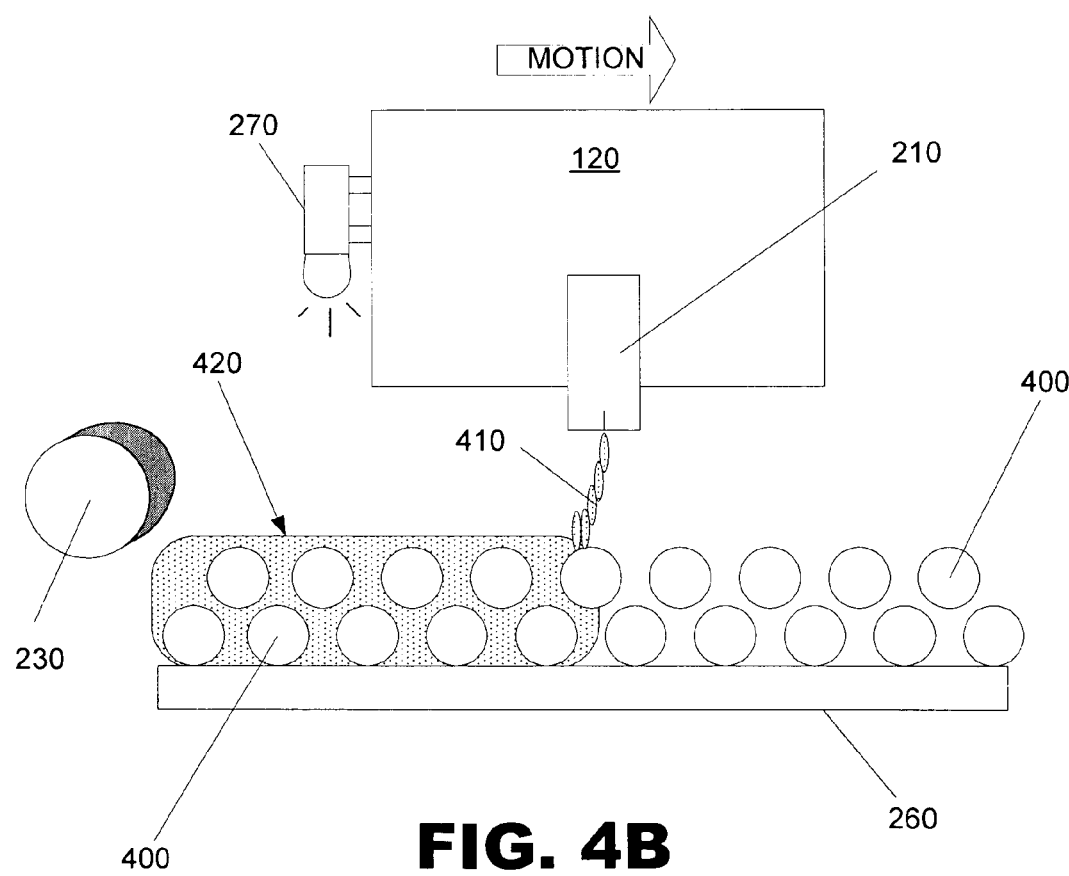
FIG. 4B is a cross-sectional view showing the deposition of a reactive material according to one exemplary embodiment.

Once the cement forming particulate blend has been spread (step 300; FIG. 3), the moveable stage (120) may selectively deposit liquid phase binder into the cement forming particulate blend (step 310; FIG. 3). As shown in FIG. 4B, the moveable stage (120) may be controllably positioned by the computing device (140; FIG. 1) and then caused to controllably deposit quantities of the liquid phase binder (410) into the cement forming particulate blend (400) forming a mixture (420). The locations where the quantities of the liquid phase binder (410) will be deposited are determined by the CAD or other computer modeling program directing the formation of the desired three-dimensional object. Once deposited, the locations containing liquid phase binder (410) will define the cross-sectional boundaries of the resulting three-dimensional object.

The amount of liquid phase binder that is deposited into the cement forming particulate blend is typically calculated as a volume ratio of binder to powder. For the present system and method, the ratio of binder to powder typically ranges from about 0.05:1 to about 0.5:1. However, a number of binder to powder ratios may be used to incorporate the present system and method.

Figure 4C:
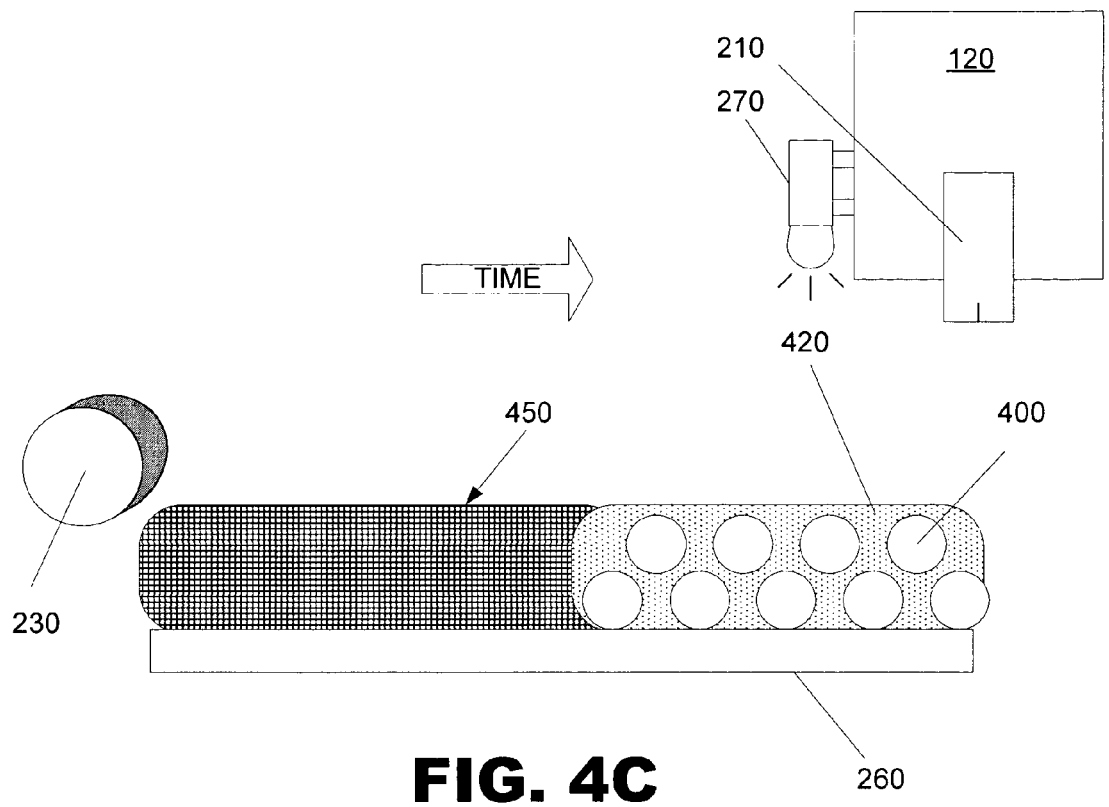
FIG. 4C is a cross-sectional view showing the application of ultraviolet (UV) rays to a one-part reactive system according to one exemplary embodiment.

When the cement forming particulate blend (400) and the liquid phase binder (410) have been combined, a number of chemical reactions take place to set the three-dimensional object (step 320; FIG. 3). By rapidly setting the three-dimensional object upon deposition of the liquid phase binder (410) into the cement forming particulate blend (400), component precision and surface finish are enhanced. As shown in FIG. 3, the setting of the three-dimensional object according to the present system and method includes the working of three setting mechanisms: a polymerization setting mechanism (step 330), an acid/base setting mechanism (step 340), and a re-precipitation setting mechanism (step 350). FIG. 4C illustrates that as time passes (indicated by arrow), the chemical reactions take place and the mixture of cement forming particulate blend (400) and liquid phase binder (410) combine to form a structural build material (450). Each of the above-mentioned setting mechanisms will now be described in more detail.

The polymerization setting mechanism (step 330; FIG. 3) requires the combination of water soluble acrylate monomers in the liquid phase binder (410) including, but in no way limited to, water soluble acrylic monomers of various mono and di-functional varieties such as 2-hydroxyethylmethacrylate, 2-hydroxybutylmethacrylate; water soluble water soluble polymerizable components located in the liquid phase binder (410) including, but in no way limited to, multifunctional monomers such as glycol dimethacrylate; and a radical forming source disposed in the cement forming particulate blend (400) including, but in no way limited to, UV/blue light initiator or peroxide plus an amine. In the present exemplary embodiment, the radical forming source is located in the cement forming particulate blend, however, the radical forming source and/or co-initiator may alternatively be located in the liquid phase binder (410) according to one exemplary embodiment. Once the above-mentioned components are combined, polymerization may be either chemically or light induced depending on the radical forming source implemented.

If a UV/blue light initiator is used as the radical forming source mentioned above, UV light may be provided to the mixture (420) of liquid phase binder (410) and cement forming particulate blend (400) to initiate polymerization of the acrylate monomers. Once the liquid phase binder (410) has been selectively dispensed into the cement forming particulate blend (400), the UV light may be provided to the mixture (420) by the radiation applicator (270). The UV light provided by the radiation applicator (270) will cause the UV/blue light initiator to release a free radical initiating the polymerization setting mechanism.

Alternatively, if a chemically induced polymerization initiator such as peroxide plus an amine is incorporated, the deposition of the liquid phase binder (410) will allow the peroxide and the amine to react thereby releasing a free radical. This release of a free radical will then commence the polymerization setting mechanism.

The acid/base setting mechanism (step 340; FIG. 3) occurs as a result of the crosslinking of polyacids with divalent cations. The acid/base setting mechanism occurs when the liquid phase binder (410; FIG. 4) wets the cement forming particulate blend (400; FIG. 4) thereby allowing polyacid components to mix and react with crosslinker components of the cement forming particulate blend. The polyacids crosslink with the crosslinker components via carboxylic acid groups and set the cross-sectional area of the desired three-dimensional object. The polyacid components may include, but are in no way limited to, polyacrylic acid, polyvinyl pyrrolidone-co-maleic acid, polyethylene-co-methacrylic acid and other poly acids. Crosslinker components of the cement forming particulate blend may include, but are in no way limited to, multivalent cation species such as calcium (2+), aluminum (3+), etc.

The re-precipitation setting mechanism (step 350) sets the three-dimensional object through re-precipitation of calcium phosphate. The re-precipitation setting mechanism includes the combination of a calcium phosphate source such as mono-, di-, tri-, and tetra-calcium phosphate with an acidic or basic environment provided by the binder in the form of phytic acid, itaconic acid, diglycolic acid, mineral acid (phosphoric acid), etc. Upon mixing, the acidic binder, which may also be basic binder, dissolves the mono-, di-, tri-, and tetra-calcium phosphate and provides the right pH to rapidly facilitate the re-precipitation of a higher order form of calcium phosphate known as hydroxyapatite. This formation of hydroxyapatite further sets the cross-sectional area of the desired three-dimensional object.

Exemplary formulas for the above-mentioned calcium phosphate reaction follow where a product of $Ca_{10}(PO_4)_6(OH)_2$ is hydroxyapatite:

$$2CaHPO_4 + 2H_2O + 2Ca_4(PO_4)_2O \rightarrow Ca_{10}(PO_4)_6(OH)_2 + 4H_2O$$

$$2CaHPO_4 + 2Ca_4(PO_4)_2O \rightarrow Ca_{10}(PO_4)_6(OH)_2$$

$$10CaHPO_4 + 2H_2O \rightarrow Ca_{10}(PO_4)_6(OH)_2 + 4H_3PO_4$$

$$3Ca_4(PO_4)_2O + 3H_2O \rightarrow Ca_{10}(PO_4)_6(OH)_2 + 2Ca(OH)_2$$

Individual setting times for the above-mentioned setting mechanisms are less than 0.1 seconds to about 5 minutes for the polymerization setting mechanism, from about 1 minute to days for the acid/base setting mechanism, and from about 15 seconds to days for the re-precipitation setting mechanism. By combining the present cement forming particulate blend (400) with the present liquid phase binder (410), the overall (system) setting time is typically less than 0.1 second to about 5 minutes for the initial set, with the final set potentially taking up to hours or days.

Figure 4D:
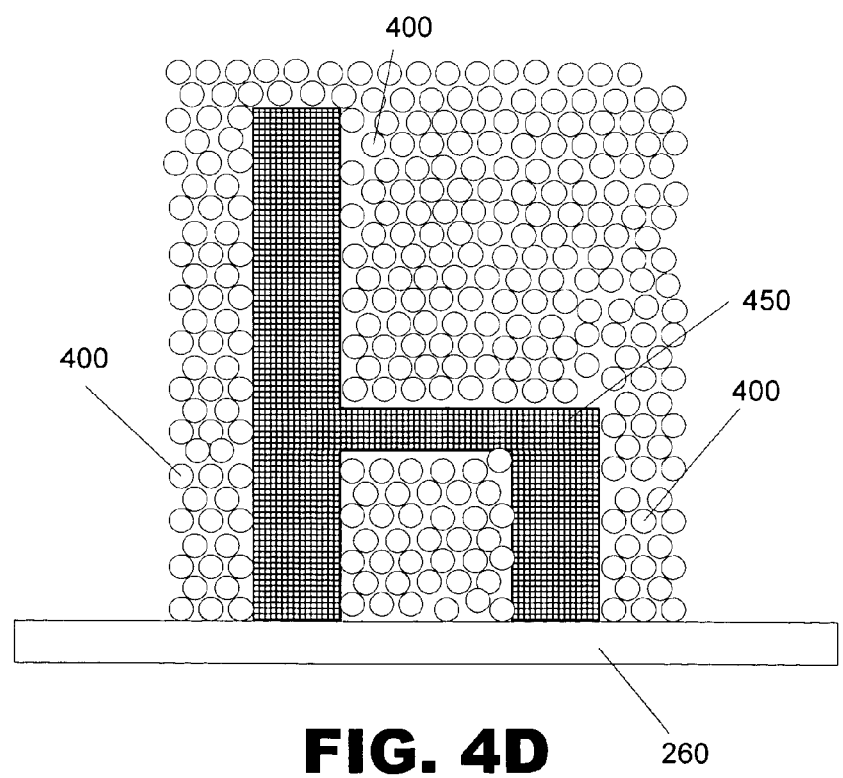
FIG. 4D is a cross-sectional view illustrating an object formed by the present method according to one exemplary embodiment.

As the above-mentioned reactions take place, the formed article sets to a hardened three-dimensional object (step 320; FIG. 3). Upon or simultaneous with formation, the computing device determines whether it has completed the desired material dispensing operation (step 360; FIG. 3). If all of the requisite dispensing has occurred to complete the desired three-dimensional object (YES, step 360; FIG. 3), then the formed object is isolated by removing the un-reacted powder and extracting the resulting three-dimensional part (step 370; FIG. 3). If, however, the computing device determines that not all of the requisite dispensing has occurred to complete the desired three-dimensional object (NO, step 360; FIG. 3), the SFF system (100; FIG. 1) again spreads and packs a quantity of cement forming particulate blend (step 300; FIG. 3) and repeats the above-mentioned process. FIG. 4D illustrates a completed three-dimensional object composed of structural build material (450). As shown in FIG. 4D, the completed three-dimensional object may, but is not necessarily required to, be formed by multiple iterations of the above-mentioned method.

Additionally, in an alternative embodiment, the present system and method may be modified to allow for the fabrication of advanced ceramic components. Generally, the ceramic forming process converts the remaining calcium phosphate in the mixture (420) of cement forming particulate blend (400) and liquid phase binder (410) to a higher order calcium phosphate known as hydroxyapatite in the presence of heat, while the organic material is burned off. The presence of organic material facilitates this process.

In conclusion, the present solid freeform fabrication system and method effectively provide a SFF system with enhanced mechanical properties. More specifically, the combination of the above-described cement forming particulate blend with the above-described liquid phase binder enhance working time and improves mechanical properties of the resulting SFF article when compared to typical phosphate cement. Examples of the improved mechanical properties provided by the three setting mechanisms incorporated by the present system and method include enhanced compression strength, fracture toughness, tensile strength, and long term wear resistance when compared to typical phosphate cement. Moreover, the addition of LDH and polymer-clay nanocomposite fillers provides additional reinforcement of physical properties and reduced moisture loss and dry-cracking in low humidity environments. Similarly, the inclusion of polymer resins and the organophillic nanocomposites may reduce water sensitivity of formed objects by acting as moisture receptors that absorb excess binder during formation. Moreover, the present method and system may quickly produce a three-dimensional object by providing the powder in bulk, while eliminating the need to form support structures.

The preceding description has been presented only to illustrate and describe exemplary embodiments of the system and method. It is not intended to be exhaustive or to limit the system and method to any precise form disclosed. Many modifications and variations are possible in light of the above teaching. It is intended that the scope of the system and method be defined by the following claims.

What is claimed is:

1. A method for solid free-form fabrication of a three-dimensional object, comprising:
   depositing a particulate blend in a defined region, said particulate blend including radical source particulates, polyacid particulates, multivalent cation particulates, and calcium phosphate source particulates;
   ink-jetting a liquid phase binder onto a predetermined area of said particulate blend to form hydrated cement in said predetermined area, wherein said liquid phase binder is acidic and includes reactive monomers; and
   setting said hydrated cement.

2. The method of claim 1, further comprising removing a portion of said particulate blend that does not form said hydrated cement.

3. The method of claim 1, wherein said setting said hydrated cement further comprises:
   performing a polymerization setting reaction;
   performing an acid/base setting reaction; and
   performing a re-precipitation setting reaction.

4. The method of claim 1, wherein said reactive monomers comprise one of 2-hydroxyethylmethacrylate or 2-hydroxybutylmethacrylate.

5. The method of claim 1, wherein said radical source particulates comprise one of benzophenone or an ultraviolet/blue light initiator.

6. The method of claim 5, further comprising radiating said hydrated cement with ultraviolet light.

7. The method of claim 1, wherein said polyacid particulates comprise one of polyacrylic acid (PAA), polyvinyl pyrolidone-co-maleic acid, or polyethylene-co-methacrylic acid.

8. The method of claim 1, wherein said multivalent cation particulates comprise one of calcium (2+) or aluminum (3+).

9. The method of claim 1, wherein said calcium phosphate source particulates comprises one of mono-calcium phosphate, di-calcium phosphate, tri-calcium phosphate, or tetra-calcium phosphate.

10. The method of claim 1, wherein said liquid phase binder further comprises one of phytic acid, itaconic acid, diglycolic acid, or phosphoric acid.

11. The method of claim 1, wherein said liquid phase binder further comprises multifunctional monomers including glycol dimethacrylate.

12. The method of claim 1, wherein said particulate blend further comprises reaction accelerators.

13. The method of claim 12, wherein said reaction accelerators comprise one of tartaric acid, citric acid, glutamic acid, diglycolic acid, DL aspartic acid, iminodiacetic acid, itaconic acid, or NH4H2PO4.

14. The method of claim 1, wherein said particulate blend further comprises strengthening agents.

15. The method of claim 14, wherein said strengthening agents comprise nanocomposites.

16. The method of claim 15, wherein said nanocomposites comprise one of PEO/clay nanocomposites, hydroxyapatite nanocomposites, layered double hydroxide (LDH) nanocomposites, or organophillic nanocomposites.

17. The method of claim 1, wherein said liquid phase binder comprises colorants.

18. The method of claim 1, wherein said aqueous binder comprises water, organic acid, water soluble acrylic monomers, mineral acid, catalyst, dye colorants, pigment colorants, pyrrolidone, 1,5-hexanediol, liponic ethylene glycol, and surfynol 465.

* * * * *